(12) United States Patent
Seregin et al.

(10) Patent No.: US 9,491,460 B2
(45) Date of Patent: Nov. 8, 2016

(54) BANDWIDTH REDUCTION FOR VIDEO CODING PREDICTION

(71) Applicant: QUALCOMM Incorporated, San Diego, CA (US)

(72) Inventors: Vadim Seregin, San Diego, CA (US); Xianglin Wang, San Diego, CA (US); Joel Sole Rojals, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 14/227,839

(22) Filed: Mar. 27, 2014

(65) Prior Publication Data
US 2014/0294078 A1  Oct. 2, 2014

Related U.S. Application Data

(60) Provisional application No. 61/806,700, filed on Mar. 29, 2013, provisional application No. 61/808,479, filed on Apr. 4, 2013.

(51) Int. Cl.
| | |
|---|---|
| *H04N 19/51* | (2014.01) |
| *H04N 19/176* | (2014.01) |
| *H04N 19/119* | (2014.01) |
| *H04N 19/513* | (2014.01) |
| *H04N 19/109* | (2014.01) |
| *H04N 19/136* | (2014.01) |

(Continued)

(52) U.S. Cl.
CPC ...... *H04N 19/00684* (2013.01); *H04N 19/109* (2014.11); *H04N 19/119* (2014.11); *H04N 19/136* (2014.11); *H04N 19/176* (2014.11); *H04N 19/186* (2014.11); *H04N 19/426* (2014.11); *H04N 19/503* (2014.11); *H04N 19/513* (2014.11); *H04N 19/577* (2014.11)

(58) Field of Classification Search
CPC ............... H04N 19/00684; H04N 19/176; H04N 19/119; H04N 19/513; H04N 19/503; H04N 19/136; H04N 19/186; H04N 19/426; H04N 19/577; H04N 19/109
USPC .................................................. 375/240.15
See application file for complete search history.

(56) References Cited

U.S. PATENT DOCUMENTS

| | | | |
|---|---|---|---|
| 2005/0013500 A1* | 1/2005 | Lee ....................... | H04N 19/176 382/251 |
| 2007/0031049 A1* | 2/2007 | Kim ..................... | H04N 19/149 382/239 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Shan Elahi
(74) *Attorney, Agent, or Firm* — Shumaker & Sieffert, P.A.

(57) ABSTRACT

In one example, an apparatus for coding video data comprises a video coder configured to obtain a motion vector for predicting a video block with a non-4:2:0 chroma format, determine a video block size for the video block, modify the motion vector to generate a modified motion vector for obtaining samples of at least one reference picture with which to predict the video block if the video block size meets a size criterion, and generate a prediction block for the video block using the samples of the at least one reference picture and the modified motion vector.

41 Claims, 11 Drawing Sheets

(51) Int. Cl.
*H04N 19/186* (2014.01)
*H04N 19/426* (2014.01)
*H04N 19/577* (2014.01)
*H04N 19/503* (2014.01)

(56) References Cited

U.S. PATENT DOCUMENTS

| | | | | |
|---|---|---|---|---|
| 2008/0043843 A1* | 2/2008 | Nakaishi | ............... | H04N 19/176 375/240.16 |
| 2008/0111721 A1* | 5/2008 | Reznik | ................... | H03M 7/40 341/67 |
| 2009/0097558 A1* | 4/2009 | Ye | ...................... | H04N 19/176 375/240.13 |
| 2011/0002391 A1* | 1/2011 | Uslubas | ............... | H04N 19/176 375/240.16 |
| 2011/0261882 A1* | 10/2011 | Zheng | .................. | H04N 19/105 375/240.13 |
| 2011/0274162 A1* | 11/2011 | Zhou | .................... | H04N 19/176 375/240.03 |
| 2012/0008690 A1* | 1/2012 | Lee | ...................... | H04N 19/105 375/240.16 |
| 2012/0027088 A1* | 2/2012 | Chien | ................... | H04N 19/52 375/240.15 |
| 2012/0082224 A1* | 4/2012 | Van Der Auwera | . | H04N 19/176 375/240.12 |
| 2012/0140822 A1* | 6/2012 | Wang | ................... | H04N 19/197 375/240.12 |
| 2013/0034157 A1* | 2/2013 | Helle | .................... | H04N 19/52 375/240.12 |
| 2013/0077696 A1* | 3/2013 | Zhou | .................... | H04N 19/176 375/240.24 |
| 2013/0114732 A1* | 5/2013 | Dong | .................... | G06F 17/147 375/240.19 |
| 2013/0322538 A1* | 12/2013 | Seregin | .................. | H04N 19/52 375/240.16 |
| 2014/0064372 A1* | 3/2014 | Laroche | .................... | H04N 7/50 375/240.16 |
| 2014/0072041 A1* | 3/2014 | Seregin | ............ | H04N 19/00569 375/240.13 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T I-1.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chujoh, et al., "AHG07: A restriction of motion vector for small PU size", JCT-VC Meeting; MPEG Meeting; Feb. 1-10, 2012; San Jose; (Joint Collaborative Team on Video Coding of ISO/IEC JTC1/SC29/WG11 and ITU-T SG.16); XP030111208.
Ikai, "AHG7: Controllable Memory Bandwidth Reduction with Bi-Pred to Uni-Pred Conversion", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16); URL: http://wftp3.itu.int/av-arch/jctvc-site, No. JCTVC-H0096, Jan. 20, 2012 (Jan. 20, 2012), XP030111123, pp. 1-8.
Marpe, et al., "Improved Video Compression Technology and the Emerging High Efficiency Video Coding Standard," 2011 IEEE International Conference on Consumer Electronics, Berlin, ICCE-Berlin, pp. 52-56, Sep. 2011.
McCann, et al., "High Efficiency Video Coding (HEVC) Test Model 5 (HM 5) Encoder Description", JCT-VC Meeting; MPEG Meeting; Nov. 21-30, 2011; Geneva; (Joint Collaborative Team on Video Coding (JCT-VC) of ISO/IEC JTC1/SC29/WG11 and ITU-T SG.16); URL:http://wftp3.itu.int/av-arch/jctvc-site/, No. JCTVC-G1102, XP030111031, 45 pp.
Seregin, et al., "AHG7: Motion vector rounding for the worst case bandwidth reduction", JCT-VC Meeting; MPEG Meeting; Apr. 27-May 7, 2012; Geneva; (Joint Collaborative Team on Video Coding of ISO/IEC JTC1/SC29/WG11 and ITU-T SG.16); XP030112114, 5 pp.
International Search Report and Written Opinion from International Application No. PCT/US2014/032180, dated Aug. 19, 2014, 12 pp.
Response to Written Opinion dated Aug. 19, 2014, from International Application No. PCT/US2014/032180, filed on Oct. 3, 2014, 5 pp.
Second Written Opinion from International Application No. PCT/US2014/032180, dated Feb. 24, 2015, 13 pp.
Response to Second Written Opinion dated Feb. 24, 2015, from International Application No. PCT/US2014/032180, filed on Apr. 21, 2015, 28 pp.
International Preliminary Report on Patentability from International Application No. PCT/US2014/032180, dated Jul. 6, 2015, 15 pp.

* cited by examiner

BANDWIDTH REDUCTION FOR VIDEO CODING PREDICTION

This application claims the benefit of U.S. Provisional Application Ser. No. 61/806,700, filed Mar. 29, 2013; and U.S. Provisional Application Ser. No. 61/808,479, filed Apr. 4, 2013; the entire content of each of which is incorporated herein by reference.

TECHNICAL FIELD

This disclosure relates to video coding and, more particularly, to motion information (e.g., motion vector) prediction for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for memory bandwidth reduction for video coding. In particular, the present disclosure describes techniques whereby a video coder, e.g., a video encoder or video decoder, reduces a number of samples to be read from picture buffers for obtaining prediction blocks for video encoding. The techniques may be particularly applicable for video coding using a non-4:2:0 chroma format for video samples.

In some examples, the techniques may include extending restrictions for bi-directional inter prediction, or "bi-prediction," to additional video block sizes or, alternatively, to fewer than all components of a given video block. In such examples, the video coder may convert a bi-directional motion vector received for obtaining a predictor for the video block to a uni-directional motion vector. In some examples, the techniques may include differently partitioning different components of a given video block such that, e.g., a video coder may split a luma component for additional compression efficiency while eschewing splitting at least one chroma component to reduce a number of pixel samples needed for prediction. In some examples, the techniques may include signaling different partition sizes for different reference picture lists for the respective motion vectors for bi-prediction. In some examples, the techniques may include applying a threshold for restrictions on bi-prediction, the threshold based on an area for a video block, a number of blocks within a size area, or a sum value of video block height and width, for instance. A video coder operating according to any one or more of the above techniques may, as a result, have a reduced peak memory bandwidth that defines a hardware specification requirement for the video coder relative to the video coding standard along with reduced costs for the relaxed hardware specification requirement.

In one example, a method of coding video data comprises obtaining a motion vector for predicting a video block with a non-4:2:0 chroma format, determining a video block size for the video block, modifying the motion vector to generate a modified motion vector for obtaining samples of at least one reference picture with which to predict the video block if the video block size meets a size criterion, and generating a prediction block for the video block using the samples of the at least one reference picture and the modified motion vector.

In another example, an apparatus for coding video data comprises a video coder configured to obtain a motion vector for predicting a video block with a non-4:2:0 chroma format, determine a video block size for the video block, modify the motion vector to generate a modified motion vector for obtaining samples of at least one reference picture with which to predict the video block if the video block size meets a size criterion, and generate a prediction block for the video block using the samples of the at least one reference picture and the modified motion vector.

In another example, an apparatus for coding video data comprises means for obtaining a motion vector for predicting a video block with a non-4:2:0 chroma format, means for determining a video block size for the video block, means for modifying the motion vector to generate a modified motion vector for obtaining samples of at least one reference picture with which to predict the video block if the video block size meets a size criterion, and means for generating a prediction block for the video block using the samples of the at least one reference picture and the modified motion vector.

In another example, a computer-readable storage medium has stored thereon instructions that, when executed, cause one or more processors of an apparatus for coding video data to obtain a motion vector for predicting a video block with a non-4:2:0 chroma format, determine a video block size for the video block, modify the motion vector to generate a modified motion vector for obtaining samples of at least one reference picture with which to predict the video block if the video block size meets a size criterion, and generate a prediction block for the video block using the samples of the at least one reference picture and the modified motion vector.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements through the text and figures.

DETAILED DESCRIPTION

Figure 1:
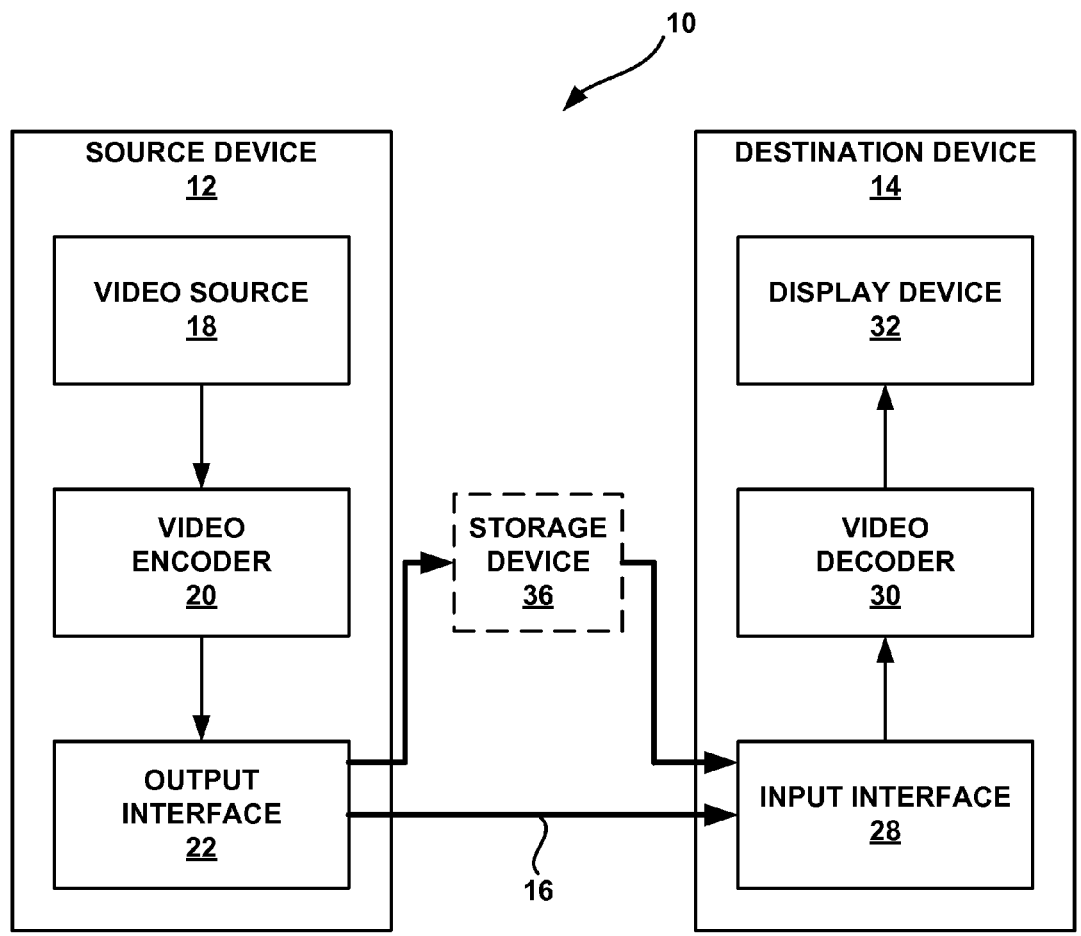
FIG. 1 is a block diagram illustrating an example video encoding and decoding system that may utilize the techniques described in this disclosure.

As discussed above, video compression techniques include temporal (inter-picture) prediction of blocks of video data, i.e., video blocks, relative to reference samples in another block in another picture. An inter-coded block is coded according to motion information, e.g., a motion vector that points to a block of reference samples forming the predictive block in the other picture. In some examples, to achieve further bitstream efficiency, the motion information, e.g., the motion vector, the prediction direction and reference picture index value, for a video block may itself be predicted using motion information prediction techniques, which are sometimes referred to as motion vector prediction (MVP) techniques.

According to such motion information prediction techniques, a video coder may derive the motion vector and/or other motion information for a current video block from a reference block. The reference blocks from which the motion information may be derived generally include a plurality of pre-defined spatially-neighboring blocks, and one or more co-located or neighboring blocks from one or more different (e.g., temporally) pictures. A video coder, e.g., a video encoder or video decoder, may construct a motion information candidate list, also referred to as a candidate list or candidate set, that includes the motion information of spatial and temporal neighboring blocks as candidate motion information for coding a video block. The video coder may encode or decode an index into the candidate list to identify the selected motion information candidate for coding the video block.

The motion information prediction modes for High Efficiency Video Coding (HEVC) (also referred to as H.265 or ISO/IEC 23008-HEVC) include a merge mode and an advanced motion vector prediction (AMVP) mode. For both modes, a video coder, e.g., a video encoder or video decoder, can construct a list of motion information candidates based on the motion information of spatially and temporally neighboring blocks. In addition, the video coder may use sub-sample precision for the motion vectors. For luma blocks obtained according to HEVC, for instance, the video coder may use quarter-sample precision with 7-tap (for the quarter-sample positions) or 8-tap filters (for the half-sample positions) for interpolating fractional-sample positions, i.e., one quarter of the distance between luma samples.

For non-4:2:0 sampling formats that sample a larger number of chroma pixels relative to the 4:2:0 chroma format, interpolating large numbers of chroma pixels for each of the chroma components in order to predict the chroma blocks may significantly increase a memory bandwidth for the video coder. Memory bandwidth refers to a data rate for data being read from or written to a computer-readable storage medium. Accordingly, increasing a memory bandwidth may refer to increasing a rate for data read from or written to such a medium and may result in this context from more data loads due to the additional number of chroma pixels required for interpolation for non-4:2:0 sampling. This may increase hardware costs for the video coder in order to meet the specifications for non-4:2:0, which may be unacceptable in some use cases. For example, a higher required memory bandwidth may require a larger bus, larger memory, a faster bus, faster memory, or some combination of these improvements for meeting specifications for the higher required memory bandwidth.

In an example according to techniques of this disclosure, a video coder may restrict the use of bi-prediction mode in video coding for non-4:2:0 formats for additional circumstances. For instance, if the chroma format is 4:2:2 or 4:4:4, the video coder may extend the bandwidth reduction operations to larger size blocks. Thus, e.g., in addition to restricting bi-prediction for 4×8 and 8×4 blocks, the video coder may detect or be configured to encode a non-4:2:0 format and therefore additionally restrict bi-prediction for any one or more larger block partition sizes, such as 8×8 blocks, 8×16/16×8 blocks, and so forth. The video coder may accordingly convert the bi-directional motion vectors for such block (again, when the video coder applies the extended restriction) to the uni-directional motion vector. The video coder may convert the bi-directional motion vectors to a uni-directional motion vector using one of the conversion techniques for merge mode or AMVP described above.

In some examples of a video coder that restricts the use of bi-prediction mode in video coding for non-4:2:0 formats as described herein, the video coder may restrict bi-prediction for larger size blocks according to the type of component, in addition to or alternatively to restricting bi-prediction for 4×8 and 8×4 blocks according the HEVC standard. For an 8×8 block encoded in a non-4:2:0 format, for instance, the video coder may restrict bi-prediction for at least one of the chroma components while permitting bi-prediction for the luma component. Accordingly, the video coder may convert the bi-directional motion vectors for such components (again, when the video applies this extended per-component restriction) to the uni-directional motion vector. Because the extended bandwidth reduction restrictions have an unequal impact on the overall coding efficiency, applying this restriction to a chroma component may have less impact on overall coding performance applying the restriction to a luma component while still potentially obtaining reductions in the required memory bandwidth for the video coding process.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 36. Similarly, encoded data may be accessed from storage device 36 by input interface 28 of destination device 14. Storage device 36 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 36 may correspond to a file server or another intermediate storage device that may hold the encoded video generated by source device 12. Destination device 14 may access stored video data from storage device 36 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 36 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 may receive the encoded video data over link 16. The encoded video data communicated over link 16, or provided on storage device 36, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In HEVC and other video coding standards, a video sequence typically includes a series of pictures. Pictures may also be referred to as "frames." A picture may include three sample arrays, denoted $S_L$, $S_{Cb}$, and $S_{Cr}$, in accordance with the tristimulus YCbCr color space. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Cb chrominance samples may be referred to herein as "U samples." Cr chrominance samples may be referred to herein as "V samples." Chrominance samples may also be referred to herein as "chroma" samples. In other instances, a picture may be monochrome and may only include an array of luma samples.

Video encoder 20 may use 4:2:0 sampling to reflect the sensitivity of the human visual system to luma relative to chroma. In this or other examples, video encoder 20 may down-sample the chroma arrays of a picture (i.e., $S_{Cb}$ and $S_{Cr}$) relative to the luma array. However, in still other cases, down sampling may be avoided to ensure the highest quality video. For example, video encoder 20 may use a YUV 4:2:0 video format, a YUV 4:2:2 video format, or a 4:4:4 video format. In the YUV 4:2:0 video format, video encoder 20 may down-sample the chroma arrays such that the chroma arrays are ½ the height and ½ the width of the luma array. In the YUV 4:2:2 video format, video encoder 20 may down-sample the chroma arrays such that the chroma arrays are ½ the width and the same height as the luma array. In the YUV 4:4:4 video format, video encoder 20 does not down-sample the chroma arrays. Samples for each of the Y, Cr, and Cr components may be represented using 8-bit or 10-bit precision, for instance.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block (PB) of luma samples, two corresponding prediction blocks (PBs) of chroma samples of a picture, and syntax structures used to predict the PB samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Video encoder 20 may use intra prediction or inter prediction to generate the predictive blocks for a PU. If video encoder 20 uses intra prediction to generate the predictive blocks of a PU, video encoder 20 may generate the PBs of the PU based on decoded samples of the picture associated with the PU. The PB size may be set as the same as the CB size for all block sizes (e.g., for all N) with the exception of the smallest coding block size allowable in the bitstream. In this exception case, the CB may be split into four prediction block quadrants each having a separate intrapicture prediction mode.

If video encoder 20 uses inter prediction to generate the PBs of a PU, luma and chroma CBs may be split into one, two, or four PBs. As noted above with respect to the CU splitting into PUs, the CBs of a CU may be split into symmetric or asymmetric motion partition for PBs. Video encoder 20 assigns each inter-predicted prediction block one or two motion vectors (MVs) and indices to a reference picture list (described below in further detail). HEVC specifies that, due to memory bandwidth bottlenecks that would otherwise occur due to reference picture memory loading, a luma PB having size 4×4 may not be inter-predicted, and 4×8-sized and 8×4-sized lumas may not be inter-predicted using bi-prediction (i.e., lumas of these dimensions are restricted to uni-prediction).

Furthermore, if video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first MV indicating a spatial displacement between a sample block of the PU and the first reference location and a second MV indicating a spatial displacement between the prediction block of the PU and the second reference location. Although described herein as usable for "bi-directional" inter prediction, the reference pictures in the different reference picture lists RefPicList0 and RefPicList1 are not necessarily preceding/before and subsequent to/after, respectively, in the temporal sense. Rather, the two reference picture lists may in some cases both include data from one or more previous frames or may both include data from one or more subsequent frames. The data in the two reference picture lists may also in some situations be identical.

Video encoder 20 may use sub-sample precision for the MVs. For luma PBs obtained according to HEVC, for instance, the video encoder 20 may use quarter-sample precision with 7-tap (for the quarter-sample positions) or 8-tap filters (for the half-sample positions) for interpolating fractional-sample positions, i.e., one quarter of the distance between luma samples.

Chroma sample MV fractional accuracy may be variable according to the chroma sampling format. For instance, 4:2:0 format results in units of $\frac{1}{8}^{th}$ of the distance between chroma samples, given that there are half as many chroma samples for each of the horizontal and vertical dimensions. Fractional sample interpolation for the chroma PBs is similar, however, to that of the luma PB. However, video encoder 20 may use a 4-tap filter for interpolation for the chroma components, which again for the 4:2:0 format results in $\frac{1}{8}^{th}$ fractional accuracy. For the 4:2:2 format, the horizontal fractional accuracy with a 4-tap filter is $\frac{1}{8}^{th}$, and the vertical fractional accuracy is $\frac{1}{4}^{th}$. For the 4:4:4 format, the chroma sample MV fractional accuracy is identical to that of the luma blocks.

Figure 11:
FIG. 11 is a block diagram illustrating example integer and fractional sample position matrix for component interpolation.

To derive a luma PB, therefore, video encoder 20 performs fractional sample interpolation using an 8-tap filter. FIG. 11 is a block diagram illustrating example integer and fractional sample position matrix 400 for component interpolation. The current HEVC standard defines these 8-tap filters for the half-sample (hfilter) and quarter-sample (qfilter) interpolation positions as shown in Table 1.

TABLE 1

Fractional sample interpolation filters

| Index i    | −3 | −2 | −1  | 0  | 1  | 2   | 3 | 4 |
|------------|----|----|-----|----|----|-----|---|---|
| hfilter[i] | −1 | 4  | −11 | 40 | 40 | −11 | 4 | 1 |
| qfilter[i] | −1 | 4  | 10  | 58 | 17 | −5  | 1 |   |

TABLE 2

Pixels needed for fractional sample interpolation

| Chroma format | PU size              | Luma pixels | Chroma pixels | Total pixels | Worst case |
|---------------|----------------------|-------------|---------------|--------------|------------|
| 4:2:0         | 8 × 4, 8 × 4 uni     | 15 × 11*2   | 7 × 5*2*2     | 470          | 646 pixels |
|               | 8 × 8 bi             | 15 × 15*2   | 7 × 7*2*2     | 646          |            |
| 4:4:4         | 8 × 4, 8 × 4 uni     | 15 × 11*2   | 11 × 7*2*2    | 638          | 934 pixels |
|               | 8 × 8 bi             | 15 × 15*2   | 11 × 11*2*2   | 934          |            |

The position in matrix 400 labeled $A_{0,0}$ is an instance of integer positions $A_{i,j}$, which represent luma samples for different values of integers i, j. Video encoder 20 applies the fractional sample interpolation filters to obtain fractional sample values as follows:

$$a_{i,j} \left( \sum_{i=-3 \ldots 3} A_{i,j} qfilter[i] \right) \gg (B-8)$$

$$b_{i,j} \left( \sum_{i=-3 \ldots 4} A_{i,j} hfilter[i] \right) \gg (B-8)$$

$$c_{i,j} \left( \sum_{i=-2 \ldots 4} A_{i,j} qfilter[1-i] \right) \gg (B-8)$$

$$d_{i,j} \left( \sum_{i=-3 \ldots 3} A_{0,j} qfilter[i] \right) \gg (B-8)$$

$$h_{i,j} \left( \sum_{i=-3 \ldots 4} A_{0,j} hfilter[i] \right) \gg (B-8)$$

$$n_{i,j} \left( \sum_{i=-2 \ldots 4} A_{0,j} qfilter[1-j] \right) \gg (B-8)$$

In the equations above, B refers to the bit depth of the reference sample, e.g., 8-bit, and >> denotes a right-shift operation. Video encoder 20 may derive the fractional samples located at the remaining positions, e, f, g, i, j, k, p, q, and r, in matrix 400 by applying the corresponding filters to sample located at vertically adjacent positions according to corresponding formulas for the remaining positions. Returning now to FIG. 1, video encoder 20 therefore obtains pixels/samples that are located outside of the reference block in order to do the interpolation. In the case of the above filtering formulas for an 8-tap filter for the luma PB, video encoder 20 may read samples at positions −3 through +4 in both the horizontal and vertical directions, which for an 8×8 luma prediction block requires fetching a 15×15 set of pixels of a reference picture for uni-prediction. For bi-prediction, the number of pixels is doubled along with the number of reference pictures, resulting in 15×15*2 pixels. For 8×4 and 4×8 luma PBs, the number of pixels to be fetched is 15×11*2 for uni-prediction. As noted above, HEVC restricts 8×4 and 4×8 luma PBs to uni-prediction.

Video encoder 20 applies fractional sample interpolation to the chroma components similarly as for luma, but using a 4-tap filter. Video encoder 20 may therefore read samples at positions −2 through +1 in both the horizontal and vertical directions. For an 8×8 bi-predicted chroma prediction block in 4:2:0 format, this requires fetching an 11×11*2*2 set of pixels of the reference pictures. For 8×4 and 4×8 uni-predicted chroma PBs, the number of pixels to be fetched is 11×7*2*2. The number of pixels needed according to HEVC for fractional sample interpolation is provided in Table 2.

As can be seen from Table 2, the worst case for both the 4:2:0 chroma format and 4:4:4 chroma format is the 8×8 prediction unit that is inter predicted using bi-prediction. Note that the number of pixels required for luma inter prediction does not change, for luma is not sub-sampled in 4:2:0, 4:2:2, or 4:4:4. However, the bandwidth required to fetch samples from memory for fractional sample interpolation for the 4:4:4 chroma format is about 45% higher than the 4:2:0 chroma format. The hardware design to support non-4:2:0 chroma formats (e.g., 4:2:2 and 4:4:4) must account for the extra bandwidth needed at the needed frame generation rate. This may lead to increased hardware implementation costs for more and/or faster memory, increased system bus speeds, and so forth.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block (CB). In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In addition, video encoder 20 may decode encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded pictures for use in inter-picture prediction.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference blocks (intra-prediction) or reference blocks from another picture (inter-prediction) to produce the video block for eventual display. Video decoder 30 may be configured, instructed controlled or directed to perform the inverse of the various processes performed by video encoder 20 based on the syntax elements provided by video encoder 20 with the encoded video data in the bitstream received by video decoder 30.

For further efficiency of inter-picture prediction, video encoder 20 and video decoder 30 may implement techniques for motion information prediction, e.g., motion vector prediction (MVP). Modes of motion information prediction supported by the HM include, for example, merge mode and AMVP.

Merge mode refers to one or more video coding modes in which motion information, such as motion vectors, reference frame indices, prediction directions, or other information, for a current video block to be coded is inherited from a spatially-neighboring video block in the same picture as the current video block, or a co-located or neighboring video block in a (temporally) different picture. The spatially neighboring blocks in the same picture may be referred to as local spatial neighboring blocks. The co-located or neighboring blocks in a different picture may be referred to as temporal neighboring blocks.

To implement merge mode, video encoder 20 and video decoder 30 both implement a common, pre-defined process to evaluate the motion information of the neighboring blocks, and construct a motion information candidate list from such motion information. An index value, signaled from video encoder 20 to video decoder 30, may be used to identify which candidate in the candidate list is used to code the video block, and thus from which neighboring block the current video block inherits its motion information (e.g., a above, above-right, left, below-left, or above-left block, relative to the current block, or from a temporally adjacent picture).

Skip mode may comprise one type of merge mode (or a mode similar to merge mode). With skip mode, motion information is inherited, but no residual information is coded. Residual information generally refers to pixel difference information indicating pixel differences between an original, unencoded version of the block to be coded and a predictive block identified by the motion information inherited from the spatially neighboring block or co-located block. Direct mode may be another type of merge mode (or mode similar to merge mode). Direct mode may be similar to skip mode in that motion information is inherited, but with direct mode, a video block is coded to include residual information. The phrase "merge mode" is used herein to refer to any one of these modes, which may be called skip mode, direct mode or merge mode.

As noted above, inter prediction for the HEVC standard is restricted to uni-directional prediction for 8×4 and 4×8 PUs. To convert to uni-directional prediction for 8×4 and 4×8 Pus, the video encoder 20 operating according to the HEVC standard may convert the bi-directional MVs for such PUs to a uni-directional MV from RefPicList0 for merge mode. For AMVP, the video encoder 20 operating according to the HEVC standard may signal only the MVP index associated with the uni-directional MV predictor.

According to one example of techniques of this disclosure, video encoder 20 may apply modified compression techniques to improve compression. For instance, the video encoder 20 may remove the aforementioned restrictions on inter prediction, established to reduce memory bandwidth requirements, in order to improve compression efficiency of the bitstream. Accordingly, the video encoder 20 may obtain and signal the bi-prediction MV information for 8×4 and 4×8 PUs even for non-4:2:0 formats. For merge mode, therefore, the video encoder 20 signals the bi-predicted MVs and indices for the RefPicList0 and RefPicList1. For AMVP, therefore, the video encoder 20 signals the MVP indices associated with associated with the first and second MVs for the bi-prediction.

In another example of applying modified compression techniques, video encoder 20 may relax restrictions for bandwidth reduction by applying different forms of partitioning for different components of a coding unit partitioned according to a particular partition size, such as 8×4 or 4×8. For instance, for a CU having a non-2N×2N partition type, video encoder 20 may partition the luma CB according to the CB partition type and yet partition at least one of the chroma CBs according to the 2N×2N partition type (i.e., not split). As one example, the video encoder 20 may partition a CU with a 2N×N partition type into two luma 2N×2 PBs, a 2N×2N Cr component PB, and a 2N×2N Cb component PB. The video encoder 20 may derive motion information for the at least one chroma CB that is differently partitioned than the luma CB by obtaining the motion information always from the first luma PB, always from the second, third, or fourth luma PBs, or by combining the motion information from the various luma PBs in some manner. This may reduce the memory bandwidth required for performing fractional sample interpolation for the chroma component PBs.

In another example of applying modified compression techniques, the video encoder 20 may signal for bi-prediction inter prediction at least one luma or chroma component to have a non-2N×2N partition type for a block to be predicted using a reference picture from one reference picture list while using the 2N×2N partition type (i.e., not split) for the same block to obtain a predictor from a picture of another reference picture list. For example, the video encoder 20 may signal a 2N×N partition type for reference list RefPicList0 while using the 2N×2N partition for RefPicList1 (or vice-versa) to bi-predict a block. These techniques may reduce the bandwidth requirements for inter prediction and allow for potentially avoiding the concomitant hardware cost increases mentioned above.

In another example according to techniques of this disclosure, video encoder 20 may restrict the use of bi-prediction mode in video coding for non-4:2:0 formats for additional circumstances. For instance, if the chroma format is 4:2:2 or 4:4:4, the video encoder 20 may extend the bandwidth reduction operations to larger size PUs. Thus, e.g., in addition to restricting bi-prediction for 4×8 and 8×4 PUs, the video encoder 20 may detect or be configured to encode a non-4:2:0 format and therefore additionally restrict bi-prediction for PU partition sizes that meet a size criterion, e.g., for any one or more larger PU partition sizes, such as 8×8 PUs, 8×16/16×8 PUs, and so forth. The video encoder 20 may accordingly convert the bi-directional motion vectors for such PUs (again, when the video encoder 20 applies the extended restriction) to the uni-directional motion vector. The video encoder 20 may convert the bi-directional MVs to a uni-directional MV using one of the conversion techniques for merge mode or AMVP described above.

In another example, the video encoder 20 may round the one or more MVs for a PU to integer-pel for PUs smaller-size PUs such as 4×8 and 8×4 PUs. Rounding a motion vector to integer-pel may refer to rounding the horizontal and vertical components of the motion vector to the nearest sample position for the component in the reference picture. In some cases, the video encoder 20 may apply integer-pel rounding only for PUs obtained using bi-prediction.

The above techniques may result in bandwidth reduction, in which the number of pixels fetched for a PU fractional sample interpolation accords with the Table 3. The worst case for chroma format 4:4:4 improves from 934 pixels to 638 pixels, which is comparable to the worst case for the 4:2:0 chroma format in which bi-prediction to uni-prediction is applied to 4×8 and 8×4 PUs.

TABLE 3

Pixels needed for fractional sample interpolation with 8 × 8 restriction

| Chroma format | PU size | Luma pixels | Chroma pixels | Total pixels | Worst case |
|---|---|---|---|---|---|
| 4:4:4 | 8 × 4, 8 × 4 uni | 15 × 11*2 | 11 × 7*2*2 | 638 | 638 pixels |
|  | 8 × 8 uni | 15 × 15 | 11 × 11*2 | 467 |  |

In some examples of a video encoder 20 that restricts the use of bi-prediction mode in video coding for non-4:2:0 formats as described herein, the video encoder 20 may restrict bi-prediction for larger size PUs according to the type of component, in addition to or alternatively to restricting bi-prediction for 4×8 and 8×4 PUs according the HEVC standard. For an 8×8 CU encoded in a non-4:2:0 format, for instance, the video encoder 20 may restrict bi-prediction for at least one of the chroma PBs while permitting bi-prediction for the luma PB. Accordingly, the video encoder 20 may convert the bi-directional motion vectors for such PBs (again, when the video encoder 20 applies this extended per-component restriction) to the uni-directional motion vector. Because the extended bandwidth reduction restrictions have an unequal impact on the overall coding efficiency, applying this restriction to a chroma component may have less impact on overall coding performance applying the restriction to a luma component while still potentially obtaining reductions in the required memory bandwidth for the video coding process.

The above techniques may result in memory bandwidth reduction, in which the number of pixels fetched for a PU fractional sample interpolation accords with the Table 4. The worst case for chroma format 4:4:4 improves from 934 pixels to 692 pixels, which is also comparable to the worst case for the 4:2:0 chroma format in which bi-prediction to uni-prediction is applied to 4×8 and 8×4 PUs.

TABLE 4

Pixels needed for fractional sample interpolation with per-component restriction

| Chroma format | PU size | Luma pixels | Chroma pixels | Total pixels | Worst case |
|---|---|---|---|---|---|
| 4:4:4 | 8 × 4, 8 × 4 uni | 15 × 11*2 | 11 × 7*2*2 | 638 | 692 pixels |
|  | 8 × 8 bi | 15 × 15*2 | 11 × 11*2 | 692 |  |

Such memory bandwidth reduction may reduce, relative to systems that do not employ techniques described herein, a size of the memory buffer, speed of the memory buffer, size and/or speed of the memory bus, decrease an amount of power needed to facilitate memory read/writes, or some combination of the above.

In some examples of a video encoder 20 that restricts the use of bi-prediction mode in video coding for non-4:2:0 formats as described herein, in alternative to the above description in which video encoder 20 determines at least one chroma PB for a CU with a restriction on bi-prediction, the video encoder 20 may instead use bi-prediction (that is, obtain two predictors) for the chroma PB but use the same motion information for the two predictors. In other words, video encoder 20 may copy either of the uni-directional predictors to the other uni-directional predictor. The uni-directional predictor may come from either RefPicList0 or RefPicList1. The video encoder 20 may then apply weighted bi-prediction to the two predictors with respective weights w0 and w1 for the first predictor and the second predictor that is a copy of the first predictor. For example, consider Pred0 that may be the inter-prediction obtained using motion information with reference to RefPicList0, and Pred1 may be the inter-prediction obtained using motion information with reference to RefPicList1. The determined predictor obtained using bi-prediction is, according to weighted bi-prediction:

$$Pred_{Bi}=w0*Pred0(MV0,refIdx0)+w1*Pred1(MV1, refIdx1),\qquad(1)$$

where MV0 and MV1 are motion vectors for the corresponding predictors and refIdx0 and refIdx1 are indices to the corresponding RefPicList0 and RefPicList1. Using the alternative techniques described above, the video encoder 20 sets Pred1=Pred0 or Pred0=Pred1. When Pred1 and Pred0 are equal, $Pred_{Bi}=(w0+w1)*Pred0$ or $Pred_{Bi}=(w0+w1)*Pred1$. Although w0+w1 may not sum to 1 in all cases, if w0+w1=1, then this technique obtains a similar predictor that obtained for the previous techniques in which the video encoder 20 may restrict bi-prediction for at least one of the chroma PBs and convert a bi-prediction motion vector to a uni-prediction motion vector for the at least one of the chroma PBs (i.e. chroma components).

In the above descriptions, an 8×8 block has been used only for illustrative purposes. The techniques described above are also applicable to other block sizes.

In another example according to techniques of this disclosure, video encoder 20 may apply bi-prediction restriction according to a number of pixels in a block. For a given threshold T, for instance, the video encoder 20 may apply the bi-prediction restriction and bi-to-uni conversion for any block sized H×W in which H*W≤T. If T=64, e.g., then 4×8, 8×4, 8×8, 4×16, and 16×4 PUs are included in bi-prediction restriction. In some examples, the video encoder 20 may apply the bi-prediction restriction for a threshold T to any block sized H×W in which H+W≤T. The video encoder 20 may alternatively apply other types of thresholding.

In addition to the dimension-based threshold techniques described in the previous paragraph, the video encoder 20 may limit a bi-prediction restriction to a threshold number of blocks for a coding unit or size area. If the number of blocks of the CU to which the bi-prediction restriction is applied is exceeded, the video encoder 20 may eschew applying the restriction for remaining blocks of the size area defined by the CU, which may itself be split according to the quadtree splitting process. In one example of the above, a 16×16 CU may include four 8×8 PUs. If the threshold number of blocks is 2, the video encoder 20 may apply bi-prediction restriction to only the first 2 (or some other 2) blocks of the 16×16 CU. The remaining 8×8 PUs may be bi-predicted even though the 8×8 size would otherwise meet the size restriction for bi-prediction (at least for the chroma components in a non-4:2:0 format).

The techniques described above as being performed by the video encoder may similarly be performed by the video decoder 30. The video encoder 20 and video decoder 30 may apply any of the above examples in combination or in the alternative. As a result of applying any one or more of the above techniques, the video encoder 20 and video decoder 30 may reduce a number of pixels to be fetched for fractional sample interpolation and thereby reduce a peak memory bandwidth that defines a hardware specification requirement for the video encoder 20 and video decoder 30.

Figure 2:
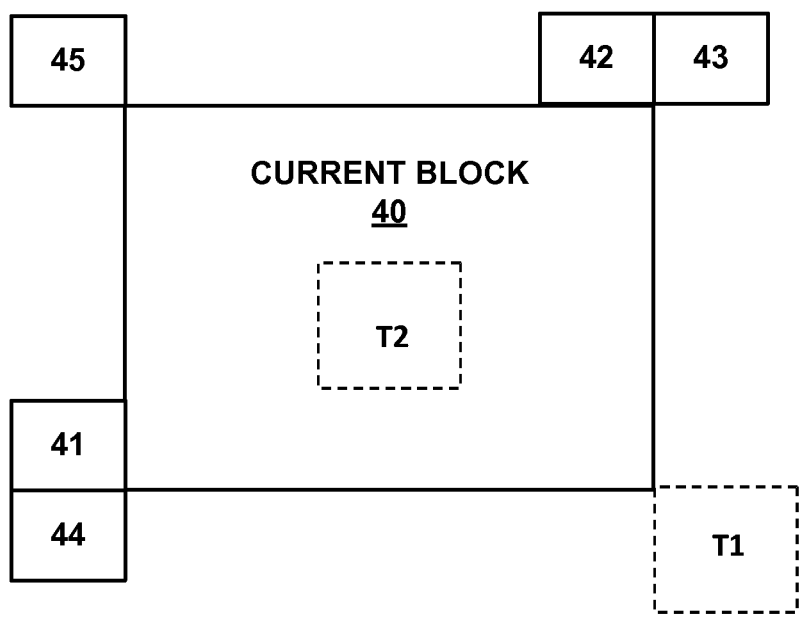
FIG. 2 is a conceptual diagram illustrating an example video block, as well as representative spatial and temporal neighboring blocks for constructing motion vector information for the example video block.

FIG. 2 is a conceptual diagram illustrating an example of a current video block 40, as well as representative spatial and temporal neighboring blocks for constructing a motion information candidate list for the example video block 40. As discussed above, both merge mode and AMVP mode include identifying motion information candidates for a current video block being coded from the motion information of spatial and temporal neighboring blocks. Furthermore, according to HEVC, for both merge mode and AMVP mode, a video coder may consider the motion information of the same candidate blocks, e.g., the set of candidate blocks illustrated by FIG. 2, when constructing a motion information candidate lists.

The example of FIG. 2 illustrates spatial neighboring blocks 41-45 and temporal neighboring blocks T1 and T2 as neighboring blocks whose motion information may be considered potential motion information candidates for coding current block 40 according to the merge mode or AMVP mode. Block 41 (left neighbor), block 42 (above neighbor), block 43 (above-right neighbor), block 44 (below-left neighbor) and block 45 (above-left neighbor) are the spatial neighboring blocks for current video block 40 illustrated in FIG. 2. Blocks 41-45 may be the spatial neighboring blocks for identifying motion information candidates for constructing a motion information candidate list for coding current video block 40 according to either or both of merge mode or AMVP mode.

Temporal neighboring blocks T1 and T2 are shown adjacent to and within current video block 40, respectively, but have dashed borders to reflect that they are in fact located in a different picture than (and are thus temporal neighbors to) current video block 40. One or both of temporal neighboring blocks T1 and T2 may be a temporal neighboring block for identifying motion information candidates for constructing a motion information candidate list for coding current video block 40 according to either or both of merge mode or AMVP mode. The temporal candidate block T1 may be below-right of current block 40 (but from the reference picture), and temporal candidate T2 can be at or near the center of a current video block 40 (but from the reference picture), as shown in FIG. 2.

Video encoder 20 and video decoder 30 may each form the list of motion information candidates in the same or similar manner for use in coding current block 40 according to the merge mode or AMVP mode. After selecting a candidate from the candidate list, video encoder 20 can signal to the video decoder an index of the selected candidate. Based on the index, the video decoder, such as video decoder 30, can identify the candidate selected by video encoder 20. Based on motion information associated with the selected candidate, video decoder 30 can decode a current video block. In order to select the proper candidate from the candidate list, video decoder 30 can construct the same candidate set used by video encoder 20.

In the HEVC coding standard, video blocks can be coded using a merge inter prediction mode and a skip mode based on merge mode, where motion information such as a motion vector, reference picture index, and inter direction from a motion information candidate can be copied to the motion information of a current block 40. In some examples, five spatial candidates can be considered along with one temporal motion information candidate (sometimes referred to as a temporal motion vector predictor or "TMVP") to form a list of candidates, e.g., a list of up to five motion information candidates. According to HEVC, the total number of candidates to be used in a merge mode motion information candidate list is fixed at five (or may be selected by a video encoder with a maximum value of five), with the list including up to four spatial motion information candidates and one temporal motion information candidate. Accordingly, in some examples, a merge mode motion information candidate list may include four of the spatial candidates (i.e., four of the candidates indicated by blocks 41-45 in FIG. 2) and one temporal motion information candidate (i.e., one of the two candidates indicated by blocks T1 and T2 in FIG. 2). The temporal motion information candidate can be T1 or, if T1 is not available, T2.

If one of the spatial or temporal motion information candidates is unavailable, or redundant with an already included motion information candidate, then the video coder may replace the redundant or unavailable candidate with the fifth spatial candidate. In some examples, a redundant or unavailable candidate may be replaced by the other of T1 or T2. The numbering shown in FIG. 2 may correspond to an example ordering in which the spatial candidates might be added to the list of candidates. Hence, using this example ordering, spatial candidate 45 would be the fifth spatial candidate and added after spatial candidates 41-44.

The scan order for consideration of the motion information neighboring candidate blocks 41-45, T1 and T2 for inclusion in the motion information candidate list may be, for example, 41-44, T1, 45. In other examples, any scan order for may be used, so long as it is employed by both video encoder 20 and video decoder 30. For example, in other configurations, the fifth spatial candidate may be considered before the temporal motion information candidate. The scan order with which a motion information candidate is considered for addition to the motion information candidate list may, for example, affect the index associated with that candidate. If there are five candidates in a list with indexes 0 to 4, the temporal motion information candidate may be assigned to any of those indexes. Similarly, the spatial candidates may also be assigned to any index.

Video encoder 20 and video decoder 30 may apply fractional sample interpolation to any of the candidate blocks T1 and T2 for determining a predictor, which may result in a high memory bandwidth due to the number of pixels fetched. According to techniques described herein, video encoder 20 and video decoder 30 may apply bandwidth reduction for determining the predictor with current block 40 and the candidates T1, T2 encoded with non-4:2:0 chroma formats. Video encoder 20 and video decoder 30 may consequently reduce the peak memory bandwidth that would otherwise be experienced with standard HEVC.

Figure 3:
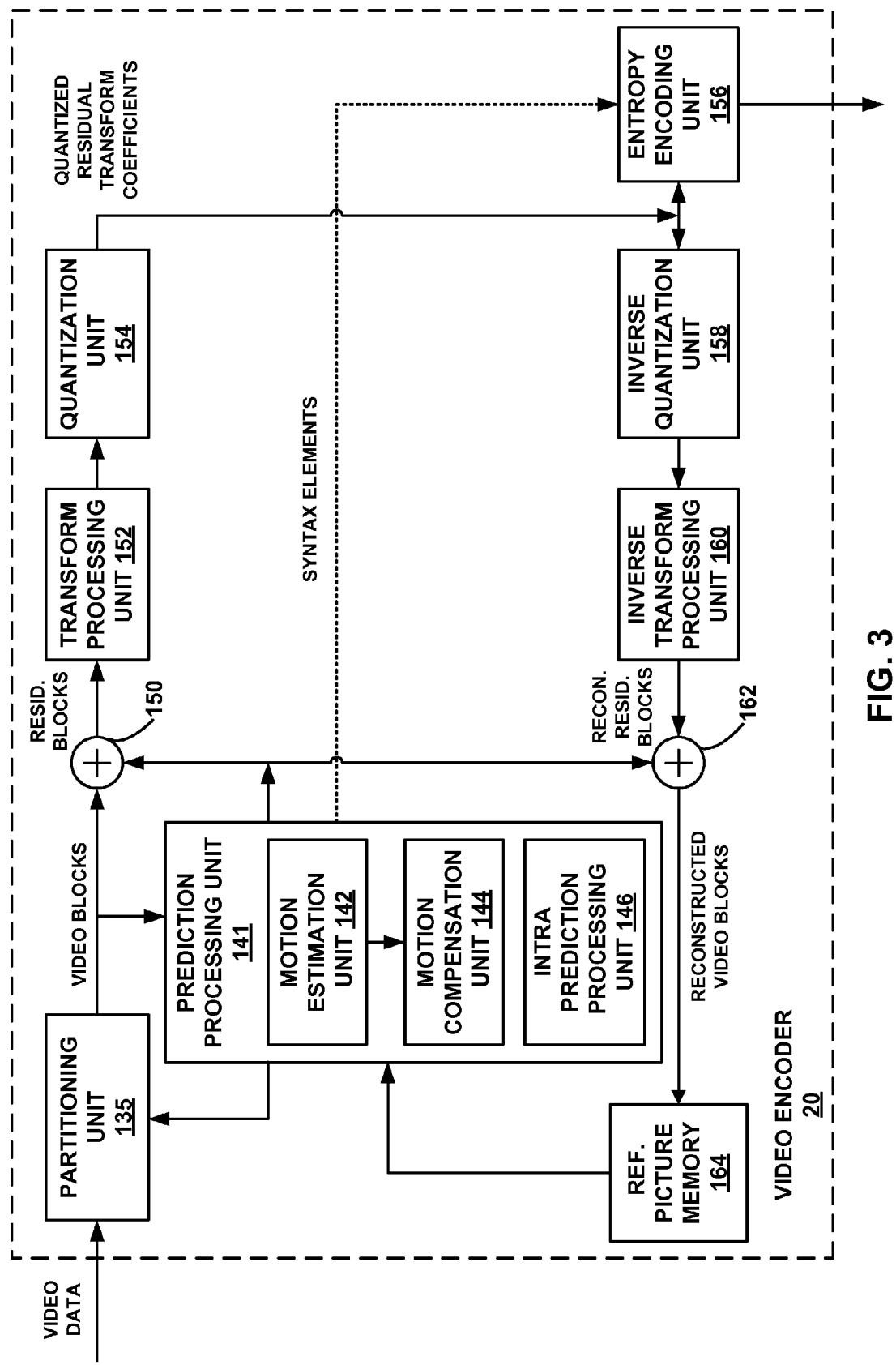
FIG. 3 is a block diagram illustrating an example video encoder that may implement the techniques described in this disclosure.

FIG. 3 is a block diagram illustrating an example video encoder 20 that may implement techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 135, prediction processing unit 141, reference picture memory 164, summer 150, transform processing unit 152, quantization unit 154, and entropy encoding unit 156. Prediction processing unit 141 includes motion estimation unit 142, motion compensation unit 144, and intra-prediction processing unit 146. For video block reconstruction, video encoder 20 also includes inverse quantization unit 158, inverse transform processing unit 160, and summer 162. A deblocking filter (not shown in FIG. 3) may also be included to filter block boundaries to remove blockiness artifacts from reconstructed video. If desired, the deblocking filter would typically filter the output of summer 162. Additional loop filters (in loop or post loop) may also be used in addition to the deblocking filter.

As shown in FIG. 3, video encoder 20 receives video data, and partitioning unit 135 partitions the data into video blocks. This partitioning may also include partitioning into slices, tiles, or other larger units, as wells as video block partitioning, e.g., according to a quadtree structure of LCUs and CUs. The example configuration of video encoder 20 illustrated in FIG. 3 generally illustrates the components that encode video blocks within a video slice to be encoded. The slice may be divided into multiple video blocks (and possibly into sets of video blocks referred to as tiles).

Prediction processing unit 141 may select one of a plurality of possible coding modes, such as one of a plurality of intra coding modes or one of a plurality of inter coding modes, for the current video block based on error results (e.g., coding rate and the level of distortion). Prediction processing unit 141 may provide the resulting intra- or inter-coded block to summer 150 to generate residual block data and to summer 162 to reconstruct the encoded block for use as a reference picture.

Intra-prediction processing unit 146 within prediction processing unit 141 may perform intra-predictive coding of the current video block relative to one or more neighboring blocks in the same frame or slice as the current block to be coded to provide spatial compression. Motion estimation unit 142 and motion compensation unit 144 within prediction processing unit 141 perform inter-predictive coding of the current video block relative to one or more predictive blocks in one or more reference pictures to provide temporal compression.

Motion estimation unit 142 may be configured to determine the inter-prediction mode for a video slice according to a predetermined pattern for a video sequence. The predetermined pattern may designate video slices in the sequence as P slices, B slices or GPB slices. Motion estimation unit 142 and motion compensation unit 144 may be highly integrated, but are illustrated separately for conceptual purposes. Motion estimation, performed by motion estimation unit 142, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 164. For example, video encoder 20 may interpolate values of one-quarter pixel positions, one-eighth pixel positions, or other fractional pixel positions of the reference picture. Therefore, motion estimation unit 142 may perform a motion search relative to the full pixel positions and fractional pixel positions and output a motion vector with fractional pixel precision.

Motion estimation unit 142 calculates a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 164. Motion estimation unit 142 sends the calculated motion vector to entropy encoding unit 156 and motion compensation unit 144.

Motion compensation, performed by motion compensation unit 144, may involve fetching or generating the predictive block based on the motion vector determined by motion estimation, possibly performing interpolations to sub-pixel precision. Upon receiving the motion vector for the PU of the current video block, motion compensation unit 144 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 150 represents the component or components that perform this subtraction operation. Motion compensation unit 144 may also generate syntax elements associated with the video blocks and the video slice for use by video decoder 30 in decoding the video blocks of the video slice.

Intra-prediction processing unit 146 may intra-predict a current block, as an alternative to the inter-prediction performed by motion estimation unit 142 and motion compensation unit 144, as described above. In particular, intra-prediction processing unit 146 may determine an intra-prediction mode to use to encode a current block. In some examples, intra-prediction processing unit 146 may encode a current block using various intra-prediction modes, e.g., during separate encoding passes, and intra-prediction processing unit 146 (or a mode select unit (not shown), in some examples) may select an appropriate intra-prediction mode to use from the tested modes. For example, intra-prediction processing unit 146 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 146 may calculate ratios from the distortions and rates for the various encoded blocks to determine which intra-prediction mode exhibits the best rate-distortion value for the block.

In any case, after selecting an intra-prediction mode for a block, intra-prediction processing unit 146 may provide information indicative of the selected intra-prediction mode for the block to entropy encoding unit 156. Entropy encoding unit 156 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 141 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 152. Transform processing unit 152 transforms the residual video data into residual transform coefficients using a transform, such as a discrete cosine transform (DCT) or a conceptually similar transform. Transform processing unit 152 may convert the residual video data from a pixel domain to a transform domain, such as a frequency domain.

Transform processing unit 152 may send the resulting transform coefficients to quantization unit 154. Quantization unit 154 quantizes the transform coefficients to further reduce bit rate. The quantization process may reduce the bit depth associated with some or all of the coefficients. The degree of quantization may be modified by adjusting a quantization parameter. In some examples, quantization unit 154 may then perform a scan of the matrix including the quantized transform coefficients. Alternatively, entropy encoding unit 156 may perform the scan.

Following quantization, entropy encoding unit 156 entropy encodes the quantized transform coefficients. For example, entropy encoding unit 156 may perform context adaptive binary arithmetic coding (CABAC), context adaptive variable length coding (CAVLC), syntax-based context-adaptive binary arithmetic coding (SBAC), probability interval partitioning entropy (PIPE) coding or another entropy encoding methodology or technique. Following the entropy encoding by entropy encoding unit 156, the encoded bitstream may be transmitted to video decoder 30, or archived for later transmission or retrieval by video decoder 30. Entropy encoding unit 156 may also entropy encode the motion vectors, other motion information, and the other syntax elements for the current video slice being coded.

Inverse quantization unit 158 and inverse transform processing unit 160 apply inverse quantization and inverse transformation, respectively, to reconstruct the residual block in the pixel domain for later use as a reference block of a reference picture. Motion compensation unit 144 may calculate a reference block by adding the residual block to a predictive block of one of the reference pictures within one of the reference picture lists. Motion compensation unit 144 may also apply one or more interpolation filters to the reconstructed residual block to calculate sub-integer pixel values for use in motion estimation. Summer 162 adds the reconstructed residual block to the motion compensated prediction block produced by motion compensation unit 144 to produce a reference block for storage in reference picture memory 164. The reference block may be used by motion estimation unit 142 and motion compensation unit 144 as a reference block to inter-predict a block in a subsequent video frame or picture.

Motion estimation and motion compensation, e.g., as performed by motion estimation unit 142 and motion compensation unit 144, may include motion information prediction according to a plurality of different motion information prediction modes, e.g., merge mode and AMVP mode. According to the techniques of this disclosure, motion estimation unit 142 and/or motion compensation unit 144 may extend or otherwise modify restrictions on bi-prediction for inter prediction performed by any of the different motion information prediction modes for non-4:2:0 chroma formats. In general, motion estimation unit 142 and/or motion compensation unit 144 may perform any of the techniques described herein (e.g., including those described with respect to FIGS. 1, 5-10) for restricting or otherwise modifying restrictions on bi-prediction for inter prediction.

Figure 4:
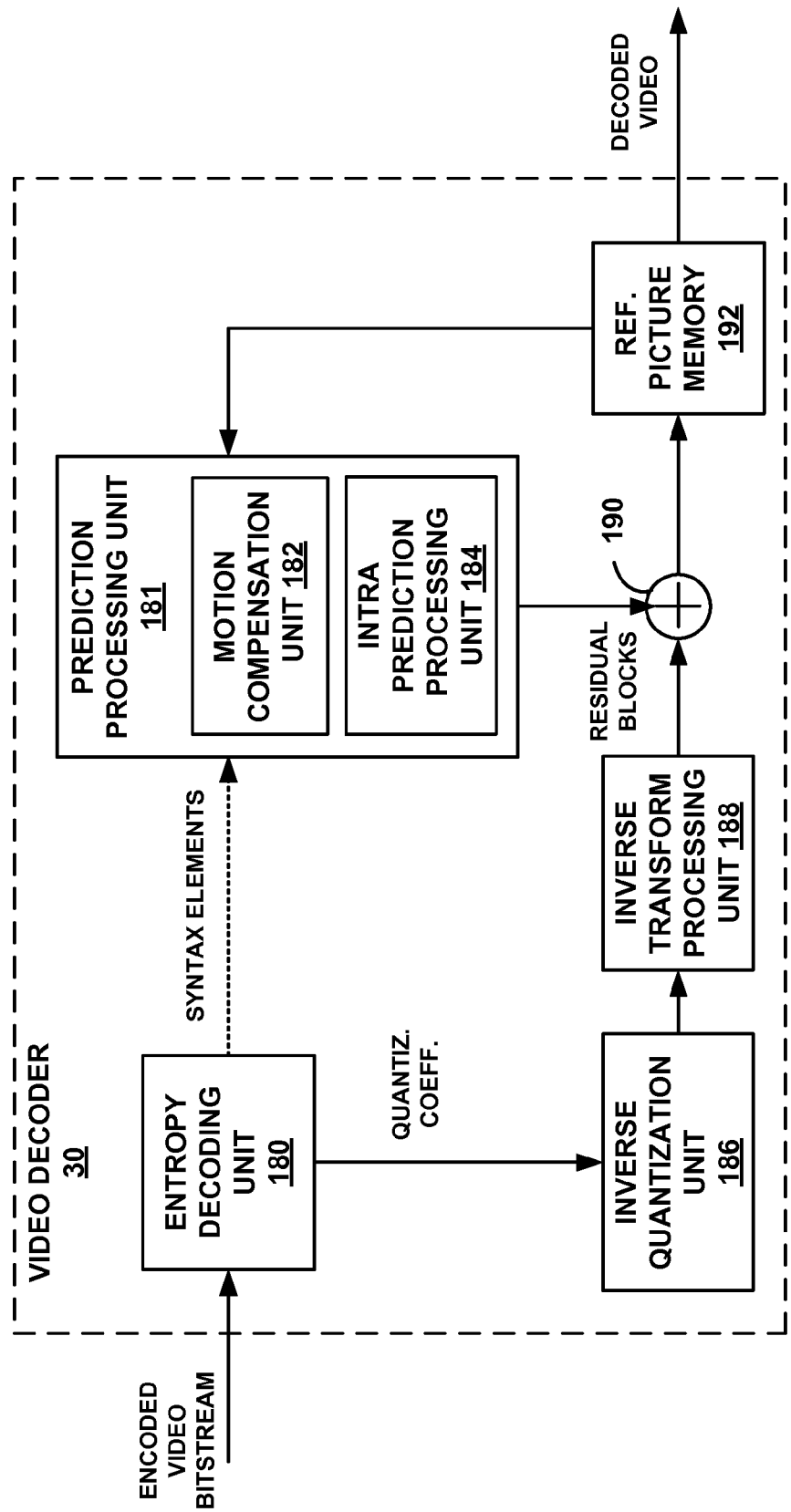
FIG. 4 is a block diagram illustrating an example video decoder that may implement the techniques described in this disclosure.

FIG. 4 is a block diagram illustrating an example video decoder 30 that may implement techniques described in this disclosure. In the example of FIG. 4, video decoder 30 includes an entropy decoding unit 180, prediction processing unit 181, inverse quantization unit 186, inverse transformation processing unit 188, summer 190, and reference picture memory 192. Prediction processing unit 181 includes motion compensation unit 182 and intra prediction processing unit 184. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Entropy decoding unit 180 of video decoder 30 entropy decodes the bitstream to generate quantized coefficients, motion vectors, other motion information, and other syntax elements. Entropy decoding unit 180 forwards the motion information and other syntax elements to prediction processing unit 181. Video decoder 30 may receive the syntax elements at the video slice level and/or the video block level, as examples. Video decoder 30 may in some cases extract the syntax elements from a bitstream received by video decoder 30.

When the video slice is coded as an intra-coded (I) slice, intra prediction processing unit 184 of prediction processing unit 181 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 182 of prediction processing unit 181 produces predictive blocks for a video block of the current video slice based on the motion vectors and other syntax elements received from entropy decoding unit 180. The predictive blocks may be produced from one of the reference pictures within one of the reference picture lists. Video decoder 30 may construct the reference frame lists, List 0 and List 1, using default construction techniques based on reference pictures stored in reference picture memory 192.

Motion compensation unit 182 determines prediction information for a video block of the current video slice by parsing the motion vectors and other syntax elements, and uses the prediction information to produce the predictive blocks for the current video block being decoded. For example, motion compensation unit 182 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 182 may also perform interpolation based on interpolation filters. Motion compensation unit 182 may use interpolation filters as used by video encoder 20 during encoding of the video blocks to calculate interpolated values for sub-integer pixels of reference blocks. In this case, motion compensation unit 182 may determine the interpolation filters used by video encoder 20 from the received syntax elements and use the interpolation filters to produce predictive blocks.

Inverse quantization unit 186 inverse quantizes, i.e., de-quantizes, the quantized transform coefficients provided in the bitstream and decoded by entropy decoding unit 180. The inverse quantization process may include use of a quantization parameter calculated by video encoder 20 for each video block in the video slice to determine a degree of quantization and, likewise, a degree of inverse quantization that should be applied. Inverse transform processing unit 188 applies an inverse transform, e.g., an inverse DCT, an inverse integer transform, or a conceptually similar inverse transform process, to the transform coefficients in order to produce residual blocks in the pixel domain.

After motion compensation unit 182 generates the predictive block for the current video block based on the motion vectors and other syntax elements, video decoder 30 forms a decoded video block by summing the residual blocks from inverse transform processing unit 188 with the corresponding predictive blocks generated by motion compensation unit 182. Summer 190 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 192, which stores reference pictures used for subsequent motion compensation. Reference picture memory 192 also stores decoded video for later presentation on a display device, such as display device 32 of FIG. 1.

Motion estimation, which may be performed in video decoder 30 by prediction processing unit 181 and/or motion compensation unit 182 as part of the motion compensation process, may include motion information prediction according to a plurality of motion information prediction modes, e.g., the merge mode and AMVP mode. According to the techniques of this disclosure, the motion information prediction according to the plurality of motion information prediction modes may include a common motion information candidate list construction process. In some examples, prediction processing unit 181 and/or motion compensation unit 182 may generate a motion information candidate list according to the list construction process for one of the motion information prediction modes, e.g., the merge mode, which can be used when coding a video block according to either the merge mode or the AMVP mode.

Prediction processing unit 181 and/or motion compensation unit 182 may receive syntax elements included in the bitstream by video encoder 20 from entropy decoding unit 180, which may indicate motion information for decoding a current video block. According to the techniques of this disclosure, prediction processing unit 181 and/or motion compensation unit 182 may extend or otherwise modify restrictions on bi-prediction for inter prediction performed by any of the different motion information prediction modes for non-4:2:0 chroma formats. In general, prediction processing unit 181 and/or motion compensation unit 182 may perform any of the techniques described herein (e.g., including those described with respect to FIGS. 1, 5-10) for restricting or otherwise modifying restrictions on bi-prediction for inter prediction.

Figure 5:
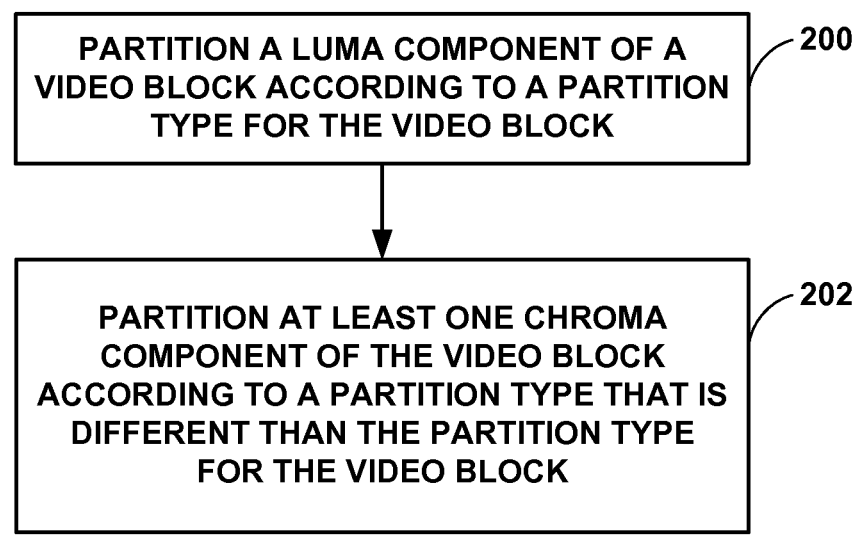
FIG. 5 is a flow diagram illustrating an example method that includes differently partitioning different components of a video block in accordance with techniques described herein for memory bandwidth reduction.

FIG. 5 is a flow diagram illustrating an example method that includes differently partitioning different components of a video block in accordance with techniques described herein for memory bandwidth reduction. According to the example method of FIG. 5, a video coder, e.g., video encoder 20 or video decoder 30, as part of an inter prediction process partitions a luma component of the video block according to a partition type of the video block (200). For instance, the video block may have a 2N×N partition type, and the video coder may partition the luma component into two 2N×N prediction blocks. However, the video coder partitions at least one chroma component of the video block according to a partition type that is different than the partition type for the video block (202). For instance, the video block may have a 2N×N partition type and the video coder may partition at least one of the Cb and Cr component of the video block into one 2N×2N prediction block.

Figure 6:
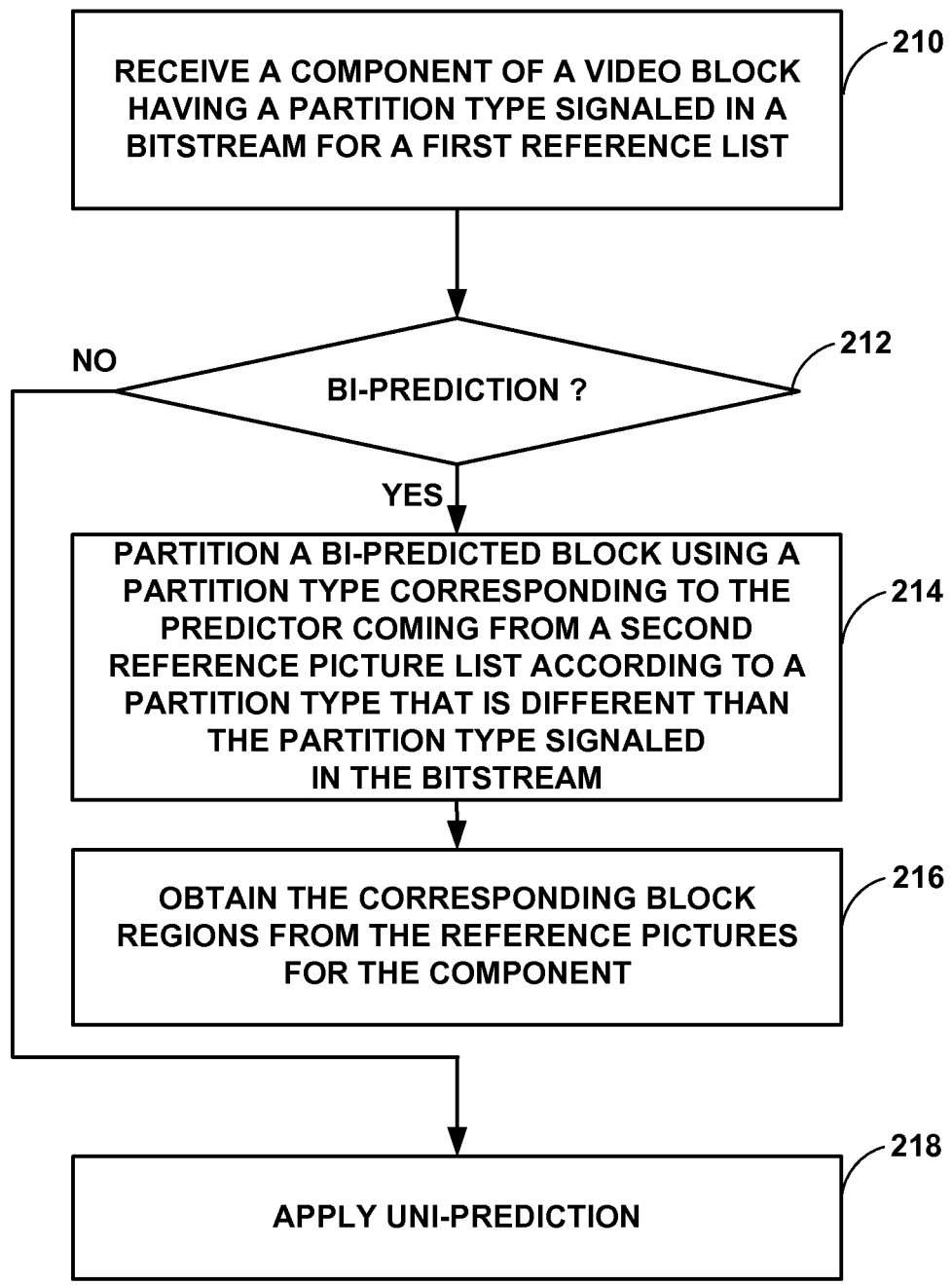
FIG. 6 is a flow diagram illustrating an example method that includes differently partitioning prediction blocks of the reference lists for bi-prediction for at least one component of a video block in accordance with techniques described herein for memory bandwidth reduction.

FIG. 6 is a flow diagram illustrating an example method that includes differently partitioning prediction blocks of the reference lists for bi-prediction for at least one component of a video block in accordance with techniques described herein for memory bandwidth reduction. According to the example method of FIG. 6, a video coder, e.g., video encoder 20 or video decoder 30, as part of an inter prediction process receives a component of a video block having a partition type signaled in a bitstream for a first reference list (210). If bi-prediction is specified (YES branch of 212), the video coder partitions a video block that is bi-predicted according to a partition type corresponding to the predictor from the second reference list and different than the partition type signaled in the bitstream for the first reference list (214). The video coder then obtains the corresponding block regions for the respective partitions for the reference pictures of the first and second reference picture lists and applies inter-prediction using bi-prediction and the corresponding block regions (216). If bi-prediction is not specified (NO branch of 212), the video coder apply inter-prediction using uni-prediction (218).

Figure 7:
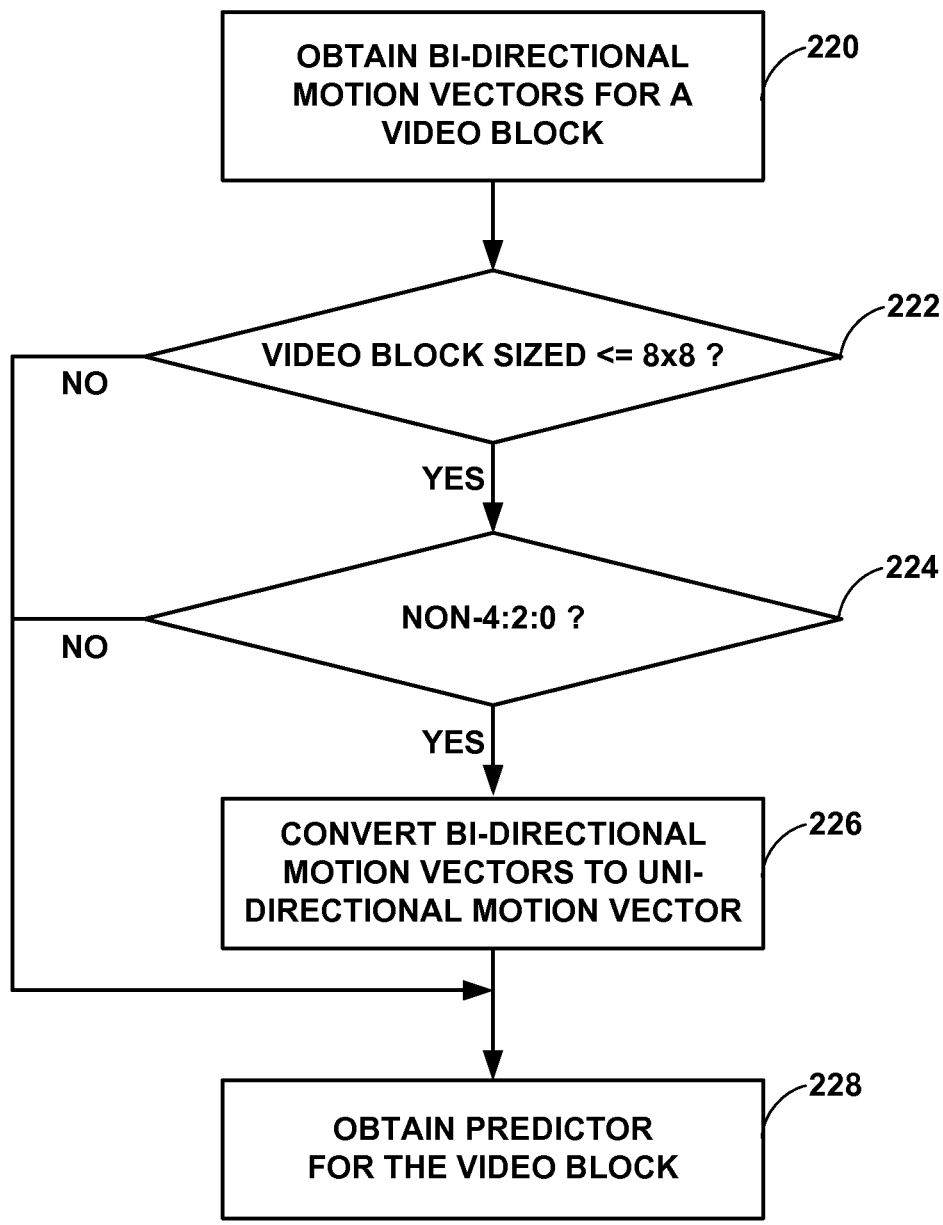
FIG. 7 is a flow diagram illustrating an example method that includes differently partitioning prediction blocks of the reference lists for bi-prediction for at least one component of a video block in accordance with techniques described herein for memory bandwidth reduction.

FIG. 7 is a flow diagram illustrating an example method that includes differently partitioning prediction blocks of the reference lists for bi-prediction for at least one component of a video block in accordance with techniques described herein for memory bandwidth reduction. According to the example method of FIG. 7, a video coder, e.g., video encoder 20 or video decoder 30, as part of an inter prediction process obtains a bi-directional motion vectors for a video block (220). If the video block is sampled at a non-4:2:0 chroma format and the video block is sized 8×8 or less, (e.g., 8×8, 8×4, or 4×8) (YES branches of 222 and 224), the video coder converts the bi-directional motion vectors to a uni-directional motion vector (226) and applies inter prediction using the uni-directional motion vector to obtain the predictor for the video block (228). If the video block is sized greater than 8×8 or the chroma format is 4:2:0 (NO branches of 222 and 224), the video coder obtains the predictor for the video block using the bi-directional motion vectors (228).

Figure 8:
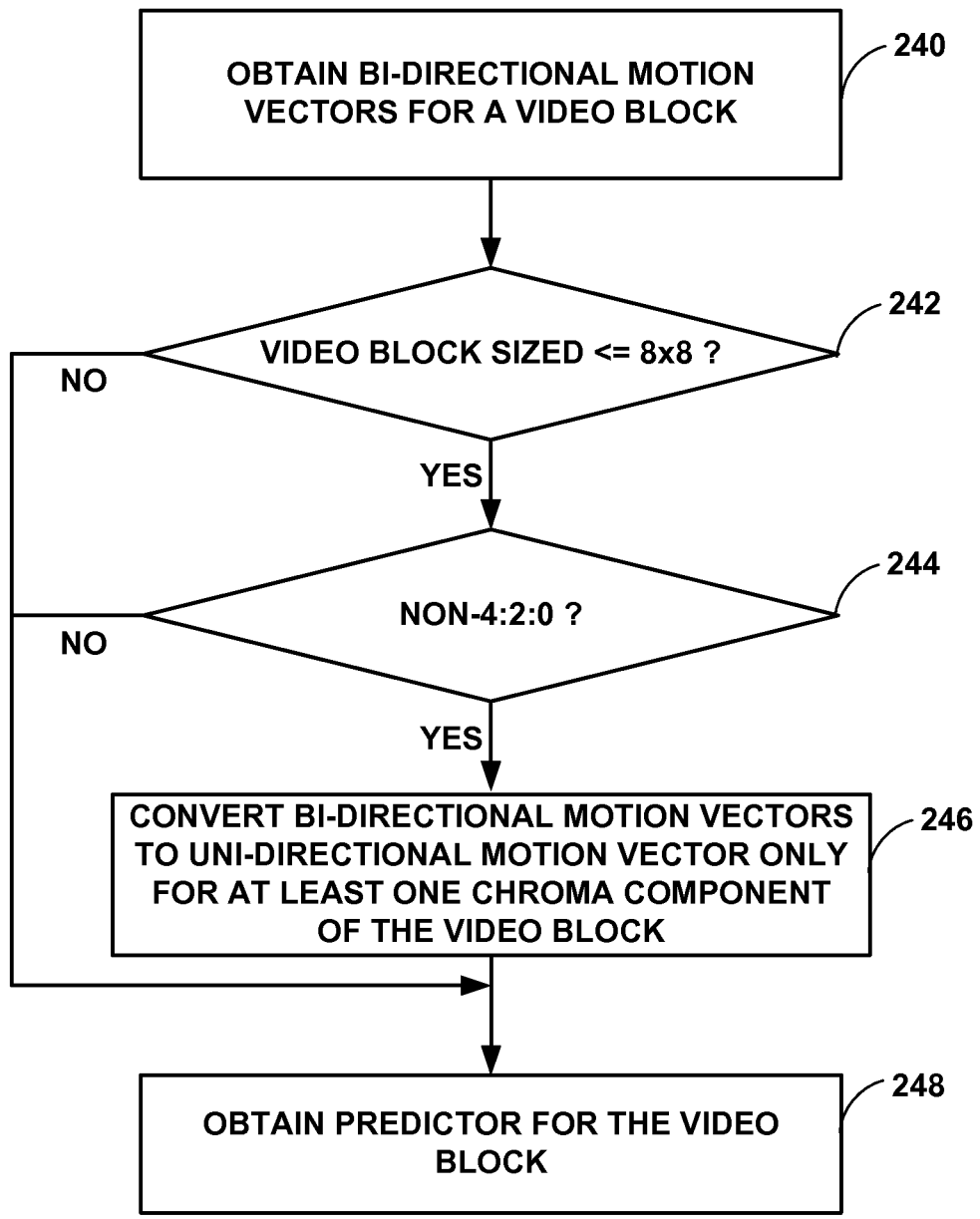
FIG. 8 is a flow diagram illustrating an example method that includes differently partitioning prediction blocks of the reference lists for bi-prediction for at least one component of a video block in accordance with techniques described herein for memory bandwidth reduction.

FIG. 8 is a flow diagram illustrating an example method that includes differently partitioning prediction blocks of the reference lists for bi-prediction for at least one component of a video block in accordance with techniques described herein for memory bandwidth reduction. According to the example method of FIG. 8, a video coder, e.g., video encoder 20 or video decoder 30, as part of an inter prediction process obtains a bi-directional motion vectors for a video block (240). If the video block is sampled at a non-4:2:0 chroma format and the video block is sized 8×8 or less, (e.g., 8×8, 8×4, or 4×8) (YES branches of 242 and 244), the video coder converts the bi-directional motion vectors to a uni-directional motion vector, but only for one or both of the chroma components of the video block and not for the luma component (246). For the components having converted vectors, applies inter prediction using the uni-directional motion vector to obtain the predictor for the components (248). If the video block is sized greater than 8×8 or the chroma format is 4:2:0 (NO branches of 222 and 224), the video coder obtains the predictor for the video block using the bi-directional motion vectors (248).

Figure 9:
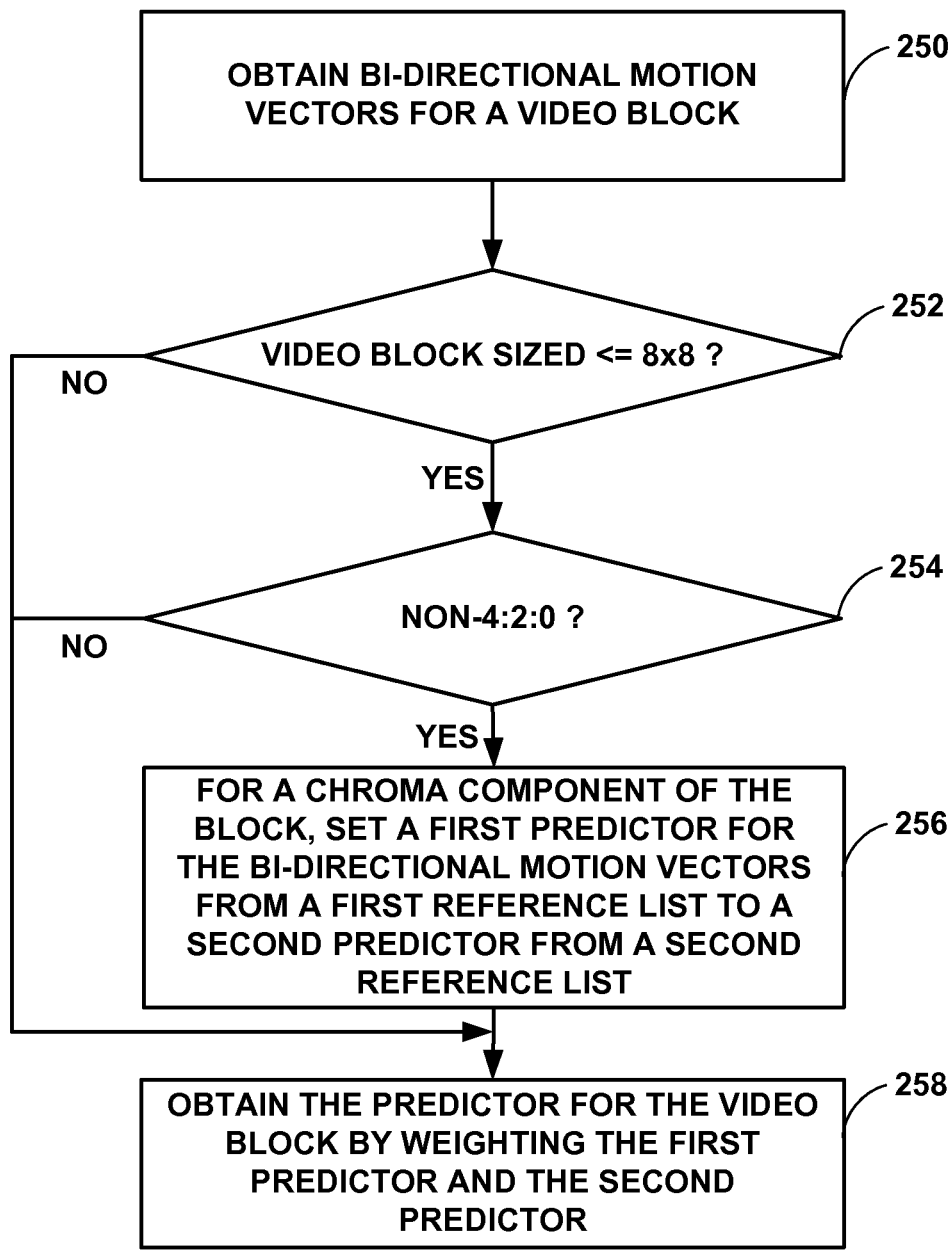
FIG. 9 is a flow diagram illustrating an example method that includes differently partitioning prediction blocks of the reference lists for bi-prediction for at least one component of a video block in accordance with techniques described herein for memory bandwidth reduction.

FIG. 9 is a flow diagram illustrating an example method that includes differently partitioning prediction blocks of the reference lists for bi-prediction for at least one component of a video block in accordance with techniques described herein for memory bandwidth reduction. According to the example method of FIG. 9, a video coder, e.g., video encoder 20 or video decoder 30, as part of an inter prediction process obtains a bi-directional motion vectors for a video block (250). If the video block is sampled at a non-4:2:0 chroma format and the video block is sized 8×8 or less, (e.g., 8×8, 8×4, or 4×8) (YES branches of 252 and 254), the video coder sets a first predictor for the bi-directional motion vectors, for a chroma block of the video block, from a first reference picture list (e.g., List0) to a second predictor from a second reference picture list (e.g., List1) (256).

The video coder applies bi-prediction inter prediction using the first and second predictors by weighting the first and second predictors according to respective weights in order to obtain the predictor for the chroma block (258). In this way, the video coder may reduce memory bandwidth for fetching pixels needed to derive the predictor.

Figure 10:
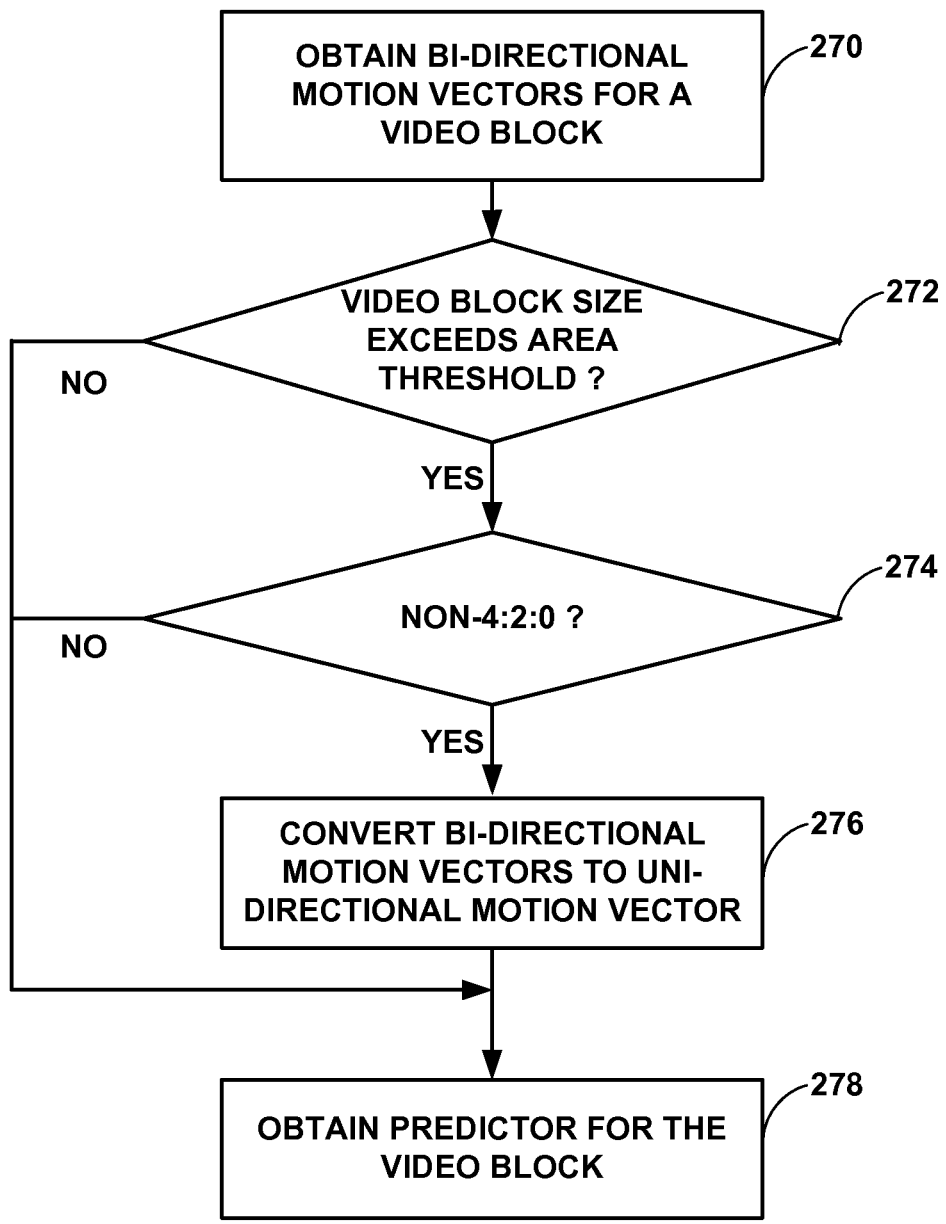
FIG. 10 is a flow diagram illustrating an example method that includes differently partitioning prediction blocks of the reference lists for bi-prediction for at least one component of a video block in accordance with techniques described herein for memory bandwidth reduction.

FIG. 10 is a flow diagram illustrating an example method that includes differently partitioning prediction blocks of the reference lists for bi-prediction for at least one component of a video block in accordance with techniques described herein for memory bandwidth reduction. According to the example method of FIG. 10, a video coder, e.g., video encoder 20 or video decoder 30, as part of an inter prediction process obtains a bi-directional motion vectors for a video block (270). If a size of the video block (e.g., H×W or H+W) exceeds a configurable threshold (YES branch of 272) and the chroma format for the video block is other than 4:2:0 (YES branch of 274), the video coder converts the bi-directional motion vectors to a uni-directional motion vector (276). The video coder then performs inter prediction to obtain the predictor for the video block according to the number of motion vectors (e.g., bi-prediction for two motion vectors or uni-prediction for a converted motion vector) (278).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   obtaining, by a processor, a motion vector for predicting a video block with a non-4:2:0 chroma format;
   determining, by the processor, a video block size for the video block;
   obtaining, by the processor, a partition type for the video block;
   in response to determining that the partition type for the video block meets a partition size criterion and that the video block size meets a size criterion, partitioning, by the processor, a first color component of the video block according to the partition type for the video block and partitioning a second color component of the video block according to a partition type for the second color component that is different than the partition type for the video block;
   generating, by the processor, a motion vector for obtaining samples of at least one reference picture with which to predict the video block; and
   generating, by the processor, a prediction block for the video block using the samples of the at least one reference picture and the motion vector for predicting the video block,
   wherein generating the motion vector for predicting the video block comprises generating a motion vector for the second color component of the video block based at least on a motion vector for the first color component of the video block.

2. The method of claim 1, wherein the video block size meets the size criterion if the video block size is other than 4×8 or 8×4.

3. The method of claim 1, wherein the motion vector for predicting the video block comprises bi-directional motion vectors for the video block, the method further comprising:
   modifying, by the processor, the motion vector for predicting the video block only if the video block size meets the size criterion by converting the bi-directional motion vectors to a uni-directional motion vector for the video block.

4. The method of claim 1, wherein the motion vector for predicting the video block comprises respective bi-directional motion vectors for each of the first and second color components of the video block, the method further comprising:
   modifying, by the processor, the motion vector for predicting the video block only if the video block size meets the size criterion by converting the bi-directional motion vectors only for the second color component of the video block to a uni-directional motion vector for the second color component.

5. The method of claim 1, wherein the motion vector for predicting the video block comprises bi-directional motion vectors for the video block, the method further comprising:
   modifying, by the processor, the motion vector for predicting the video block only if the video block size meets the size criterion by converting the bi-directional motion vectors to a uni-directional motion vector,
   wherein generating the prediction block for the video block comprises applying the uni-directional motion vector only to fewer than all of a plurality of color components of the video block, the plurality of color components comprising the first and second color components.

6. The method of claim 1, wherein a first predictor for the video block comprises a first motion vector for bi-prediction temporal prediction and a second predictor for the video block comprises a second motion vector for bi-prediction temporal prediction, the method further comprising:
   modifying, by the processor, the motion vector for predicting the video block only if the video block size meets the size criterion by modifying motion information comprising the motion vector for predicting the video block to set the first predictor to the second predictor,
   wherein generating the prediction block for the video block comprises applying bi-prediction using the first predictor and the second predictor.

7. The method of claim 6, wherein applying bi-prediction using the first predictor and the second predictor comprises applying a first weight to the first predictor and applying a second weight to the second predictor.

8. The method of claim 1,
   wherein coding video data comprises decoding the video data, and
   wherein obtaining the motion vector for predicting the video block with the non-4:2:0 chroma format comprises extracting, from a bitstream, one or more syntax elements that specify motion information for the motion vector.

9. The method of claim 1,
wherein coding video data comprises encoding the video data, and
wherein obtaining the motion vector for predicting the video block with the non-4:2:0 chroma format comprises deriving the motion vector for the video block from at least one reference block and encoding motion information for the motion vector to one or more syntax elements for a bitstream.

10. An apparatus for coding video data, the apparatus comprising a video coder including at least one processor and a memory that stores instructions that, when executed by the at least one processor, cause the at least one processor to:
obtain a motion vector for predicting a video block with a non-4:2:0 chroma format;
determine a video block size for the video block;
obtain a single partition type for the video block;
in response to determining that the partition type for the video block meets a partition size criterion and that the video block size meets a size criterion, partition a first color component of the video block according to the partition type for the video block and partition a second color component of the video block according to a partition type for the second color component that is different than the partition type for the video block;
generate a motion vector for obtaining samples of at least one reference picture with which to predict the video block; and
generate a prediction block for the video block using the samples of the at least one reference picture and the motion vector for predicting the video block,
wherein generating the motion vector for predicting the video block comprises generating a motion vector for the second color component of the video block based at least on a motion vector for the first color component of the video block.

11. The apparatus of claim 10, wherein the video block size meets the size criterion if the video block size is other than 4×8 or 8×4.

12. The apparatus of claim 10, wherein the motion vector for predicting the video block comprises bi-directional motion vectors for the video block, and
wherein the video coder further causes the at least one processor to convert the bi-directional motion vectors to a uni-directional motion vector for the video block only if the video block size meets the size criterion.

13. The apparatus of claim 10, wherein the motion vector for predicting the video block comprises respective bi-directional motion vectors for each of the first and second color components of the video block, and
wherein the video coder further causes the at least one processor to convert the bi-directional motion vectors only for the second color component of the video block to a uni-directional motion vector for the second color component only if the video block size meets the size criterion.

14. The apparatus of claim 10, wherein the motion vector for predicting the video block comprises bi-directional motion vectors for the video block and
wherein the video coder further causes the at least one processor to:
convert the bi-directional motion vectors to a uni-directional motion vector only if video block size meets the size criterion; and
apply the uni-directional motion vector only to fewer than all of a plurality of color components of the video block, the plurality of color components comprising the first and second color components.

15. The apparatus of claim 10,
wherein a first predictor for the video block comprises a first motion vector for bi-prediction temporal prediction and a second predictor for the video block comprises a second motion vector for bi-prediction temporal prediction, and
wherein the video coder further causes the at least one processor to:
modify motion information comprising the motion vector for predicting the video block to set the first predictor to the second predictor only if the video block size meets the size criterion; and
apply bi-prediction using the first predictor and the second predictor.

16. The apparatus of claim 15, wherein to apply bi-prediction using the first predictor and the second predictor the video coder further causes the at least one processor to apply a first weight to the first predictor and apply a second weight to the second predictor.

17. The apparatus of claim 10,
wherein the video coder comprises a video decoder configured to decode the video data, and
wherein to obtain the motion vector for predicting the video block with the non-4:2:0 chroma format the video decoder is configured to extract, from a bitstream, one or more syntax elements that specifies motion information for the motion vector.

18. The apparatus of claim 10,
wherein the video coder comprises a video encoder configured to encode the video data, and
wherein to obtain the motion vector for predicting the video block with the non-4:2:0 chroma format the video encoder is configured to derive the motion vector for the video block from at least one reference block and encode motion information for the motion vector to one or more syntax elements for a bitstream.

19. An apparatus for coding video data, the apparatus comprising:
means for obtaining a motion vector for predicting a video block with a non-4:2:0 chroma format;
means for determining a video block size for the video block;
means for obtaining a single partition type for the video block;
means for, in response to determining that the partition type for the video block meets a partition size criterion and that the video block size meets a size criterion, partitioning a first color component of the video block according to the partition type for the video block and partitioning a second color component of the video block according to a partition type for the second color component that is different than the partition type for the video block;
means for generating a motion vector for obtaining samples of at least one reference picture with which to predict the video block; and
means for generating a prediction block for the video block using the samples of the at least one reference picture and the modified motion vector for predicting the video block,
wherein generating the motion vector for predicting the video block comprises generating a motion vector for the second color component of the video block based at least on a motion vector for the first color component of the video block.

20. The apparatus of claim 19, wherein the video block size meets the size criterion if the video block size is other than 4×8 or 8×4.

21. The apparatus of claim 19, wherein the motion vector for predicting the video block comprises respective bi-directional motion vectors for each of the first and second color components of the video block, the apparatus further comprising:
means for converting, only if the video block size meets the size criterion, the bi-directional motion vectors only for the second color component of the video block to a uni-directional motion vector for the second color component.

22. The apparatus of claim 19, wherein the motion vector for predicting the video block comprises bi-directional motion vectors for the video block, the apparatus further comprising:
means for converting, only if the video block size meets the size criterion, the bi-directional motion vectors to a uni-directional motion vector, and
wherein the means for generating the prediction block for the video block comprises means for applying uni-directional motion vector only to fewer than all of a plurality of color components of the video block, the plurality of color components comprising the first and second color component.

23. The apparatus of claim 19,
wherein a first predictor for the video block comprises a first motion vector for bi-prediction temporal prediction and a second predictor for the video block comprises a second motion vector for bi-prediction temporal prediction, the apparatus further comprising:
means for modifying, only if the video block size meets the size criterion, motion information comprising the motion vector for predicting the video block to set the first predictor to the second predictor, and
wherein the means for generating the prediction block for the video block comprises means for applying bi-prediction using the first predictor and the second predictor.

24. A non-transitory computer-readable storage medium having stored thereon instructions that, when executed, cause one or more processors of an apparatus for coding video data to:
obtain a motion vector for predicting a video block with a non-4:2:0 chroma format;
determine a video block size for the video block;
obtain a single partition type for the video block;
in response to determining that the partition type for the video block meets a partition size criterion and that the video block size meets a size criterion, partition a first color component of the video block according to the partition type for the video block and partition a second color component of the video block according to a partition type for the second color component that is different than the partition type for the video block;
generate a motion vector for obtaining samples of at least one reference picture with which to predict the video block; and
generate a prediction block for the video block using the samples of the at least one reference picture and the modified motion vector for predicting the video block,
wherein generating the motion vector for predicting the video block comprises generating a motion vector for the second color component of the video block based at least on a motion vector for the first color component of the video block.

25. The non-transitory computer-readable storage medium of claim 24, wherein the video block size meets the size criterion if the video block size is other than 4×8 or 8×4.

26. The non-transitory computer-readable storage medium of claim 24, wherein the motion vector for predicting the video block comprises respective bi-directional motion vectors for each of the first and second color components of the video block, and wherein the instructions further cause the one or more processors to:
convert the bi-directional motion vectors only for the second color component of the video block to a uni-directional motion vector for the second color component.

27. The method of claim 1,
wherein the obtained partition type for the video block is a 2N×N partition type,
wherein the first color component comprises a luma component of the video block partitioned into a first 2N×N prediction block and a second 2N×N prediction block, and
wherein the second color component comprises at least one chroma component of the video block partitioned into one 2N×2N prediction block.

28. The method of claim 27, wherein a motion vector for the 2N×2N prediction block for the at least one chroma component is generated based on motion information from the first 2N×N luma prediction block for the luma component.

29. The method of claim 1, comprising:
determining, by the processor, a video block size for the video block based on a number of pixels of the video block,
wherein the video block size meets the size criterion if the video block size is less than a pixel threshold.

30. The method of claim 1, wherein the video block size meets the size criterion if the video block size is one of: 8×8, 4×16 and 16×4.

31. The apparatus of claim 10,
wherein the obtained partition type for the video block is a 2N×N partition type,
wherein the first color component comprises a luma component of the video block partitioned into a first 2N×N prediction block and a second 2N×N prediction block, and
wherein the second color component comprises at least one chroma component of the video block partitioned into one 2N×2N prediction block.

32. The apparatus of claim 31, wherein a motion vector for the 2N×2N prediction block for the at least one chroma component is generated based on motion information from the first 2N×N luma prediction block for the luma component.

33. The apparatus of claim 10, wherein the video coder further causes the at least one processor to:
determine a video block size for the video block based on a number of pixels of the video block,
wherein the video block size meets the size criterion if the video block size is less than a pixel threshold.

34. The apparatus of claim 10, wherein the video block size meets the size criterion if the video block size is one of: 8×8, 4×16 and 16×4.

35. The apparatus of claim 19,
wherein the obtained partition type for the video block is a 2N×N partition type, wherein the first color component comprises a luma component of the video block partitioned into a first 2N×N prediction block and a second 2N×N prediction block, and wherein the second color component comprises at least one chroma component of the video block partitioned into one 2N×2N prediction block.

36. The apparatus of claim 35, wherein a motion vector for the 2N×2N prediction block for the at least one chroma component is generated based on motion information from the first 2N×N luma prediction block for the luma component.

37. The apparatus of claim 19, comprising:
means for determining a video block size for the video block based on a number of pixels of the video block, wherein the video block size meets the size criterion if the video block size is less than a pixel threshold.

38. The apparatus of claim 19, wherein the video block size meets the size criterion if the video block size is one of: 8×8, 4×16 and 16×4.

39. The non-transitory computer-readable storage medium of claim 24, wherein the obtained partition type for the video block is a 2N×N partition type, wherein the first color component comprises a luma component of the video block partitioned into a first 2N×N prediction block and a second 2N×N prediction block, and wherein the second color component comprises at least one chroma component of the video block partitioned into one 2N×2N prediction block.

40. The non-transitory computer-readable storage medium of claim 39, wherein a motion vector for the 2N×2N prediction block for the at least one chroma component is generated based on motion information from the first 2N×N luma prediction block for the luma component.

41. The non-transitory computer-readable storage medium of claim 24, further comprising instructions that, when executed, cause the one or more processors to:
determine a video block size for the video block based on a number of pixels of the video block,
wherein the video block size meets the size criterion if the video block size is less than a pixel threshold.

* * * * *